United States Patent
Zhou et al.

(10) Patent No.: US 11,689,564 B2
(45) Date of Patent: Jun. 27, 2023

(54) METHOD AND APPARATUS FOR PROCESSING DATA IN CLEANING DEVICE

(71) Applicant: Beijing Baidu Netcom Science And Technology Co., LTD., Beijing (CN)

(72) Inventors: Qingzhi Zhou, Beijing (CN); Shaoyan Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 775 days.

(21) Appl. No.: 16/677,026

(22) Filed: Nov. 7, 2019

(65) Prior Publication Data

US 2020/0280580 A1 Sep. 3, 2020

(30) Foreign Application Priority Data

Feb. 28, 2019 (CN) .......................... 201910149251.9

(51) Int. Cl.
H04L 29/06 (2006.01)
H04L 9/40 (2022.01)
H04L 5/00 (2006.01)
H04L 69/163 (2022.01)

(52) U.S. Cl.
CPC ........ *H04L 63/1458* (2013.01); *H04L 5/0053* (2013.01); *H04L 63/0236* (2013.01); *H04L 63/1408* (2013.01); *H04L 69/163* (2013.01); *H04L 63/0254* (2013.01)

(58) Field of Classification Search
CPC ............... H04L 63/1458; H04L 5/0053; H04L 63/0236; H04L 63/1408; H04L 69/163; H04L 63/0254; H04L 67/141
See application file for complete search history.

(56) References Cited

U.S. PATENT DOCUMENTS

| | | | | |
|---|---|---|---|---|
| 6,381,638 B1* | 4/2002 | Mahler | ................... | H04L 61/00 370/355 |
| 6,894,981 B1* | 5/2005 | Coile | ........................ | H04L 9/40 370/401 |
| 2005/0267965 A1* | 12/2005 | Heller | ..................... | H04L 41/00 709/224 |

FOREIGN PATENT DOCUMENTS

| CN | 101127744 A | 2/2008 |
|---|---|---|
| CN | 101316271 A | 12/2008 |
| CN | 102333080 A | 1/2012 |
| CN | 105429957 A | 3/2016 |
| CN | 107547503 A | 1/2018 |
| CN | 108076003 A | 5/2018 |
| CN | 108833097 A | 11/2018 |
| CN | 109088878 A | 12/2018 |
| CN | 109246057 A | 1/2019 |

(Continued)

OTHER PUBLICATIONS

Chinese Office Action dated Nov. 15, 2021 issued in CN Application No. 201910149251.9.

(Continued)

*Primary Examiner* — Harunur Rashid
(74) *Attorney, Agent, or Firm* — Weaver Austin Villeneuve & Sampson LLP

(57) ABSTRACT

Embodiments of the present disclosure relate to a method and apparatus for processing data. The method can include: receiving a SYN message with a destination address being a target IP; establishing a session based on a quadruple of the SYN message; and forwarding the SYN message to a server corresponding to the target IP.

11 Claims, 4 Drawing Sheets

(56) References Cited

FOREIGN PATENT DOCUMENTS

WO     WO-2010000146 A1 *   1/2010   ........ G06F 11/2097

OTHER PUBLICATIONS

Shuying Pang, "Network Information Security Technology Foundation," chapter 4.4.4, 3 pages.
Zhenjian Tan, "SDN technology and the application," 2021, 6 pages.

* cited by examiner

METHOD AND APPARATUS FOR PROCESSING DATA IN CLEANING DEVICE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and in particular to, a method and apparatus for processing data.

BACKGROUND

There are more and more TCP (Transmission Control Protocol) flag based Distributed Denial of Service (DDoS) attacks on the network. In order not to affect services, the practice of the manufacturers is generally bypass cleaning, i.e., if an IP being attacked is found, then the attack traffic is diverted to a cleaning device, being cleaned and then re-injected into the original traffic. However, the server responding traffic is directly sent back to the peer terminal without passing through the cleaning device. In this way, the cleaning device only processes one-way traffic, i.e., the cleaning device can only see incoming messages, but cannot see outgoing messages, thus failing to determine the validity of messages by using the TCP protocol stack state. Therefore, common bypass cleaning devices all achieve cleaning for the TCP flag-based DDoS attacks relying on such a rude means like speed limitation. General cleaning methods are packet loss and speed limitation. For example, when the number of received TCP ACK messages reaches a certain speed, such as 1 million PPS (packet per second), then all ACK (acknowledge) messages are discarded. Such a scheme resists DDoS attacks, but will also discard ACK messages of normal services, thus affecting the normal services.

SUMMARY

Embodiments of the present disclosure present a method and apparatus for processing data.

In a first aspect, an embodiment of the present disclosure provides a method for processing data, including: receiving a SYN (synchronization) message with a destination address being a target IP; establishing a session based on a quadruple of a SYN message; and forwarding the SYN message to a server corresponding to the target IP.

In some embodiments, the method further includes: in response to receiving a message except for the SYN message, the destination address thereof being the target IP, determining whether there is a session associated with a quadruple of the message except for the SYN message; and in response to there being the session associated with the quadruple of the message except for the SYN message, forwarding the message except for the SYN message to the server corresponding to the target IP.

In some embodiments, the method further includes: in response to there being no session associated with the quadruple of the message except for the SYN message, discarding the message except for the SYN message.

In some embodiments, the method further includes: in response to an ACK message associated with the session being not received within a first preset time after establishing the session, deleting the session.

In some embodiments, the method further includes: in response to an ACK message responding to the SYN message being received within the first preset time after establishing the session and there being a session associated with a quadruple of the ACK message, forwarding the ACK message to the server corresponding to the target IP; and in response to a TCP message associated with the session associated with the quadruple of the ACK message being not received within a second preset time after receiving the ACK message responding to the SYN message within the first preset time after establishing the session, deleting the session associated with the quadruple of the ACK message.

In some embodiments, the method further includes: in response to a FIN (finish) message being received and there being a session associated with a quadruple of the FIN message, forwarding the FIN message to the server corresponding to the target IP; and in response to a TCP message associated with the session associated with the quadruple of the FIN message being not received within a third preset time after receiving the FIN message, deleting the session associated with the quadruple of the FIN message.

In some embodiments, the method further includes: in response to a RST (reset) message being received and there being a session associated with a quadruple of the RST message, forwarding the RST message to the server corresponding to the target IP, and immediately deleting the session associated with the quadruple of the RST message.

In a second aspect, an embodiment of the present disclosure provides an apparatus for processing data, including: a receiving unit configured to receive a SYN message with a destination address being a target IP; an establishing unit configured to establish a session based on a quadruple of the SYN message; and a sending unit configured to forward the SYN message to a server corresponding to the target IP.

In some embodiments, the apparatus further includes: a determining unit configured to: in response to receiving a message except for the SYN message, the destination address thereof being the target IP, determine whether there is a session is associated with a quadruple of the message except for the SYN message; and in response to there being the session associated with the quadruple of the message except for the SYN message, forward the message except for the SYN message to the server corresponding to the target IP.

In some embodiments, the determining unit is further configured to: in response to there being no session associated with the quadruple of the message except for the SYN message, discard the message except for the SYN message.

In some embodiments, the apparatus further includes: a deleting unit configured to: delete the session, in response to an ACK message associated with the session being not received within a first preset time after establishing the session.

In some embodiments, the deleting unit is further configured to: in response to an ACK message responding to the SYN message being received within the first preset time after establishing the session and there being a session associated with a quadruple of the ACK message, forward the ACK message to the server corresponding to the target IP; and in response to a TCP message associated with the session associated with the quadruple of the ACK message being not received within a second preset time after receiving the ACK message responding to the SYN message within the first preset time after establishing the session, delete the session associated with the quadruple of the ACK message.

In some embodiments, the deleting unit is further configured to: in response to a FIN message being received and there being a session associated with a quadruple of the FIN message, forward the FIN message to the server corresponding to the target IP; and in response to a TCP message associated with the session associated with the quadruple of the FIN message being not received within a third preset time after receiving the FIN message, delete the session associated with the quadruple of the FIN message.

In some embodiments, the deleting unit is further configured to: in response to a RST message being received and there being a session associated with a quadruple of the RST message, forward the RST message to the server corresponding to the target IP, and immediately delete the session associated with the quadruple of the RST message.

In a third aspect, an embodiment of the present disclosure provides an electronic device, including: one or more processors; and a storage apparatus, storing one or more programs thereon, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the program, when executed by a processor, implements the method according to any one implementation in the first aspect.

The method and apparatus for processing data provided in embodiments of the present disclosure maintain a simple TCP session by a cleaning device, establish a session when receiving a SYN message, clean out an ACK message which does not establish the session, and retain a normal ACK message, thus having no influences on normal services whilst resisting DDoS attacks.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. Features of the present disclosure will be described below in detail with reference to the accompanying drawings and in combination with embodiments.

Figure 1:
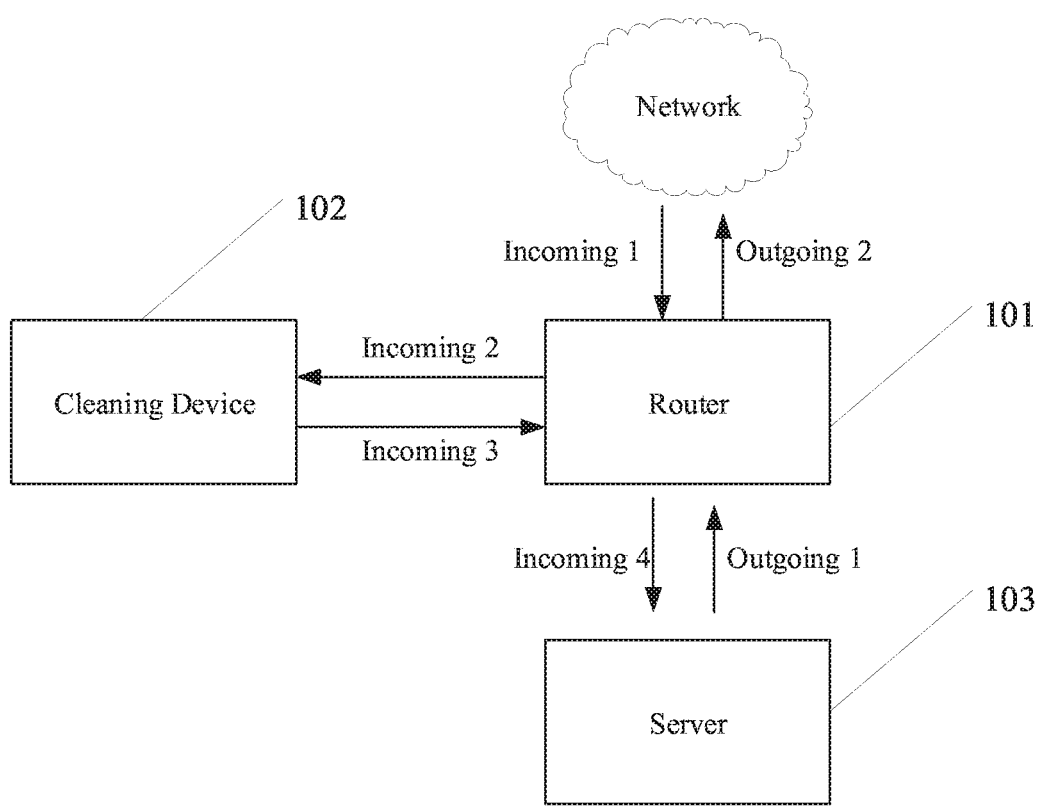
FIG. 1 is an architectural diagram of an example system in which some embodiments of the present disclosure may be implemented.

FIG. 1 shows an example system architecture 100 in which a method for processing data or an apparatus for processing data may be implemented.

As shown in FIG. 1, the system architecture 100 may include a router 101, a cleaning device 102, and a server 103. A network serves as a medium providing a communication link between the router 101, the cleaning device 102, and the server 103. The network may include various types of connections, such as wired or wireless communication links, or optical cables.

The router 101 may divert attack traffic to the cleaning device 102. The attack traffic is cleaned by the cleaning device 102, and then re-injected into a server corresponding to a source station IP.

The cleaning device 102 is configured to filter data of accessing a target domain, and return the filtered normal traffic to the source station IP. The cleaning device 102 may perform data cleaning by providing a highly defensive IP. The highly defensive IP is a paid value-added service promoted for a situation that an Internet server suffers from high-traffic DDoS attacks, making services unavailable. A user may set a highly defensive IP, and then divert the attack traffic to the highly defensive IP, to ensure the stability and reliability of the source station. The user purchases the highly defensive IP, resolves the domain name onto the highly defensive IP, and sets a forwarding rule on the highly defensive IP at the same time. All public network traffic will go through the cleaning device in a highly defensive computer room. User's access is forwarded to the source station IP by the highly defensive IP by an approach of port protocol forwarding. At the same time, malicious attack traffic is cleaned and filtered on the highly defensive IP, and then the normal traffic is returned to the source station IP, so as to ensure the protection service of stable access to the source station IP.

The server 103 is a server attacked by DDoS. The responding traffic of server 103 is directly sent back to a peer terminal without passing through the cleaning device. In this way, the cleaning device only processes one-way traffic, i.e., the cleaning device can only see incoming messages, but cannot see outgoing messages. In case of no attack, a network traffic direction is incoming 1→incoming 4→outgoing 1→outgoing 2 successively. When being attacked, all traffic will be diverted to the cleaning device, and then re-injected. Thus, the network traffic direction is incoming 1→incoming 2→incoming 3→incoming 4→outgoing 1→outgoing 2 successively. The cleaning device will only lead incoming traffic, i.e., traffic from a network client to the server, to the cleaning device, but will not lead traffic from the server to the network to the cleaning device, such that the cleaning device will fail to determine whether a current message is valid by using a TCP state machine mechanism during cleaning.

It should be noted that the cleaning device may be hardware or software. When the cleaning device is hardware, the cleaning device may be implemented as a distributed server cluster composed of a plurality of servers, or be implemented as a single server. When the cleaning device is software, the cleaning device may be implemented as a plurality of software programs or software modules (e.g., a plurality of software programs or software modules for providing distributed services), or be implemented as a single software program or software module. This is not specifically limited here.

It should be noted that the method for processing data provided in an embodiment of the present disclosure is generally executed by the cleaning device 102. Accordingly, the apparatus for processing data is generally provided in the cleaning device 102.

It should be understood that the numbers of routers, cleaning devices, and servers in FIG. 1 are merely illustrative. Any number of routers, cleaning devices, and servers may be provided based on actual requirements.

Figure 2:
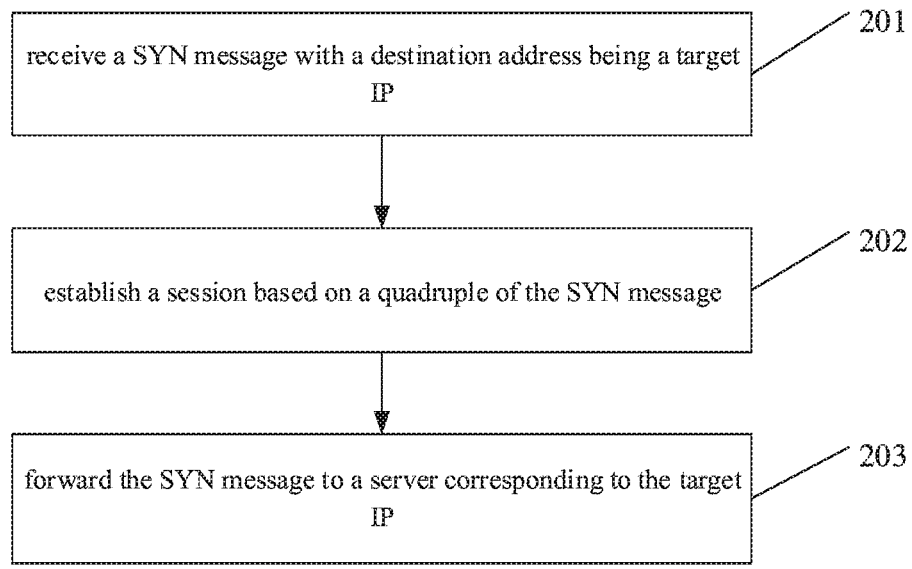
FIG. 2 is a flowchart of a method for processing data according to an embodiment of the present disclosure.

Further referring to FIG. 2, a process 200 of a method for processing data according to an embodiment of the present disclosure is shown. The method for processing data includes:

Step 201: receiving a SYN message with a destination address being a target IP.

In the present embodiment, an executing body (e.g., the cleaning device shown in FIG. 1) of the method for processing data may receive a to-be-cleaned TCP message with a destination address being the target IP from a router through wired connection or wireless connection. A cleaning device performs data cleaning based on IP, and the router may lead data of an IP with a destination address being an attacked server to the cleaning device. If the to-be-cleaned TCP message is a SYN message, then steps 202-203 are executed. SYN (synchronization): denotes synchronization serial number, and for establishing a connection. A SYN flag is used in combination with an ACK (acknowledge) flag. When a client end requests a connection, SYN=1, ACK=0; and when the connection is responded by a server, SYN=1, ACK=1. A packet of this flags is often used for port scanning: a scanner sends a packet merely containing SYN, if a peer host responds with a packet, then it indicates that the host has this port. However, since this scanning approach only performs the first handshake of the TCP three-handshakes, the success of this scanning represents that the scanned machine is less safe, and a safe host will force a connection to strictly perform the TCP three-handshakes.

Step 202: establishing a session based on a quadruple of the SYN message.

Figure 3:
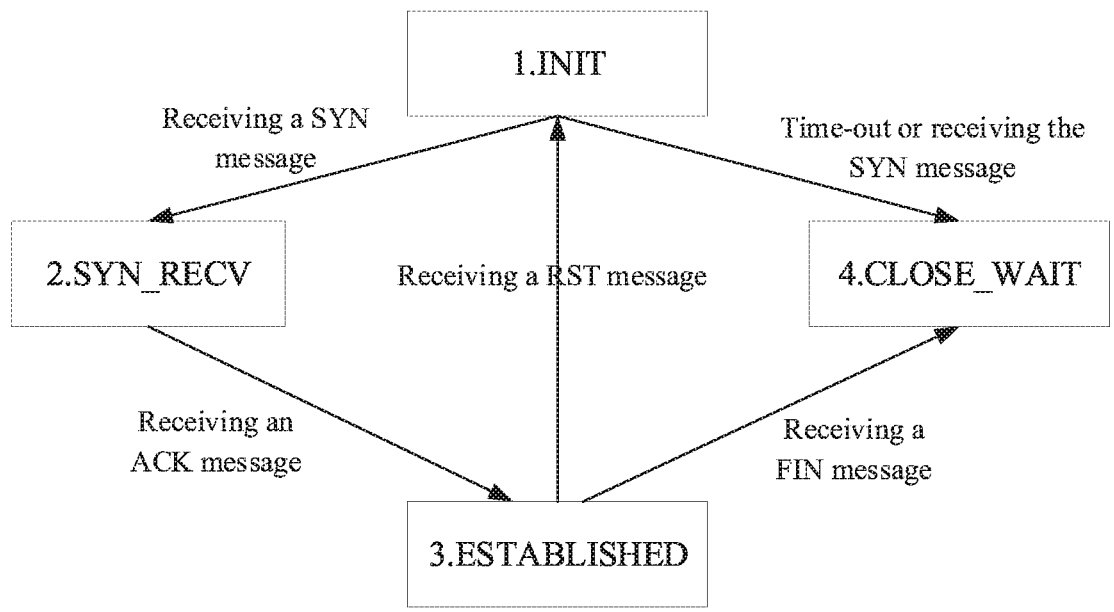
FIG. 3 is a schematic diagram of an application scenario of the method for processing data according to an embodiment of the present disclosure.

In the present embodiment, the cleaning device establishes a session after receiving the SYN message without waiting for a ACK replied from the server. Because an ACK message replied from the server does not pass through the cleaning device, the cleaning device cannot maintain the session by using a normal TCP state machine. A simple session scheme is used in the cleaning device. A TCP state machine of the cleaning device is shown in FIG. 3. A session maintained in the cleaning device is not a real TCP session. The real TCP session is self-maintained by the server. Only after three handshakes, can the server establish the session. Messages of a given session have a given quadruple: Source IP Destination IP|source TCP port destination TCP port, referred to as a socket. If values before and after "|" of the given session are exchanged, a session thus obtained also belongs to a session, but comes from a different direction. A given session ID may be assigned to the given session. The session ID may include quadruple information. The quadruple information in a message received each time is compared with an existing session ID, to determine whether a session associated with the message is established.

Step 203: forwarding the SYN message to a server corresponding to the target IP.

In the present embodiment, the cleaning device directly forwards the SYN message to the server corresponding to the target IP without cleaning the SYN message.

In some alternative implementations of the present embodiment, if an ACK message associated with the session is not received within a first preset time after establishing the session, the session is deleted. The first preset time may be set as 3 seconds. When a quadruple of the ACK message received by the cleaning device is consistent with a quadruple of the session established based on the quadruple of the SYN message, the ACK message associated with the session is considered to be received, and then forwarded to the server, such that the server completes the three-handshakes. If the ACK message is not received, then the server cannot complete the three-handshakes, and the real TCP session fails to be established.

In some alternative implementations of the present embodiment, if an ACK message responding to the SYN message is received within the first preset time after establishing the session, and there is a session associated with the quadruple of the ACK message, then the ACK message is forwarded to the server corresponding to the target IP. If a TCP message associated with the session associated with the quadruple of the ACK message is not received within a second preset time after the ACK message responding to the SYN message being received within the first preset time after establishing the session, the session associated with the quadruple of the ACK message is deleted. If the ACK message is received and forwarded to the server, the server may directly feed back the ACK message to the client end, and establish a real session. If the TCP message associated with a session is not received within the second preset time after the ACK message responding to the SYN message being received within the first preset time after establishing the session, then the session is deleted, also the session ID is deleted at the same time. Under normal circumstances, TCP has a keep-alive mechanism, and TCP messages will be continuously sent the server. If no message associated with the session is received within the second preset time, then the client end of the session may be an attacking terminal. Therefore, after the session being deleted, all messages sent by the attacking terminal will be discarded by the cleaning device, and will no longer be forwarded to the server. The second preset time may be set as 90 seconds.

In some alternative implementations of the present embodiment, in response to receiving a message except for the SYN message, the destination address thereof being the target IP, whether there is a session is associated with a quadruple of the message except for the SYN message is determined. If there is a session associated with the quadruple of the message except for the SYN message, then the message except for the SYN message is forwarded to the server corresponding to the target IP. With the above-mentioned session, cleaning a flag attack becomes very easy: when the cleaning device receives a SYN message, a new session is established; after receiving a message except for the SYN message, the session is searched in an internal memory based on the session ID. If the session cannot be found, then the message is directly cleaned out, or otherwise, the message is permitted through if the session is found. Thus, a normal service message will not be cleaned by mistake.

In some alternative implementations of the present embodiment, if a RST message is received, and there is a session associated with a quadruple of the RST message, the RST message is forwarded to the server corresponding to the target IP and the session associated with the quadruple of the RST message is immediately deleted. RST (reset): denotes a connection reset request, for resetting those connections producing mistakes, and for rejecting incorrect and illegal packets. After receiving the RST message, the RST message is immediately deleted. Because the RST message is not retransmitted, thus it is not necessary to consider the situation that after the deletion the RST message is discarded due to failure to find out the session during retransmission.

Further referring to FIG. 3, FIG. 3 is a schematic diagram of an application scenario of the method for processing data according to the present embodiment. In the application scenario of FIG. 3, a state of a cleaning device before receiving any data is INIT (initial state). When the cleaning device receives a SYN message, the state of the cleaning device is changed to SYN_RECV (SYN receiving state, a connection request having reached, waiting for acknowledgment), and the SYN message is forwarded to a server. At this time, the cleaning device establishes a session based on a quadruple of the SYN message, but the session has a very short time effect, and will be deleted if no ACK message is received within 3 seconds. Only after finding the session being established when receiving an ACK message responding to the SYN message, will an ESTABLISHED (the session established) state be entered, and the ACK message is forwarded to the server. If the ACK message is received, a corresponding session cannot be found based on a TCP quadruple of the ACK message, and then the ACK message is discarded. If a RST message is received in the ESTABLISHED state, then the session is immediately deleted, and the cleaning device enters an INIT state, and the RST message is forwarded to the server. If a FIN message is received in the ESTABLISHED state, then a CLOSE_WAIT (connection close wait) state is entered, and the FIN message is forwarded to the server. Time-out is set for the CLOSE_WAIT state. If the time-out expires or the RST message is received, then the session is deleted.

The method provided in the above embodiments of the present disclosure, by maintaining a simple TCP session in a cleaning device, may permit through a normal TCP message without cleaning a normal service message by mistake.

Figure 4:
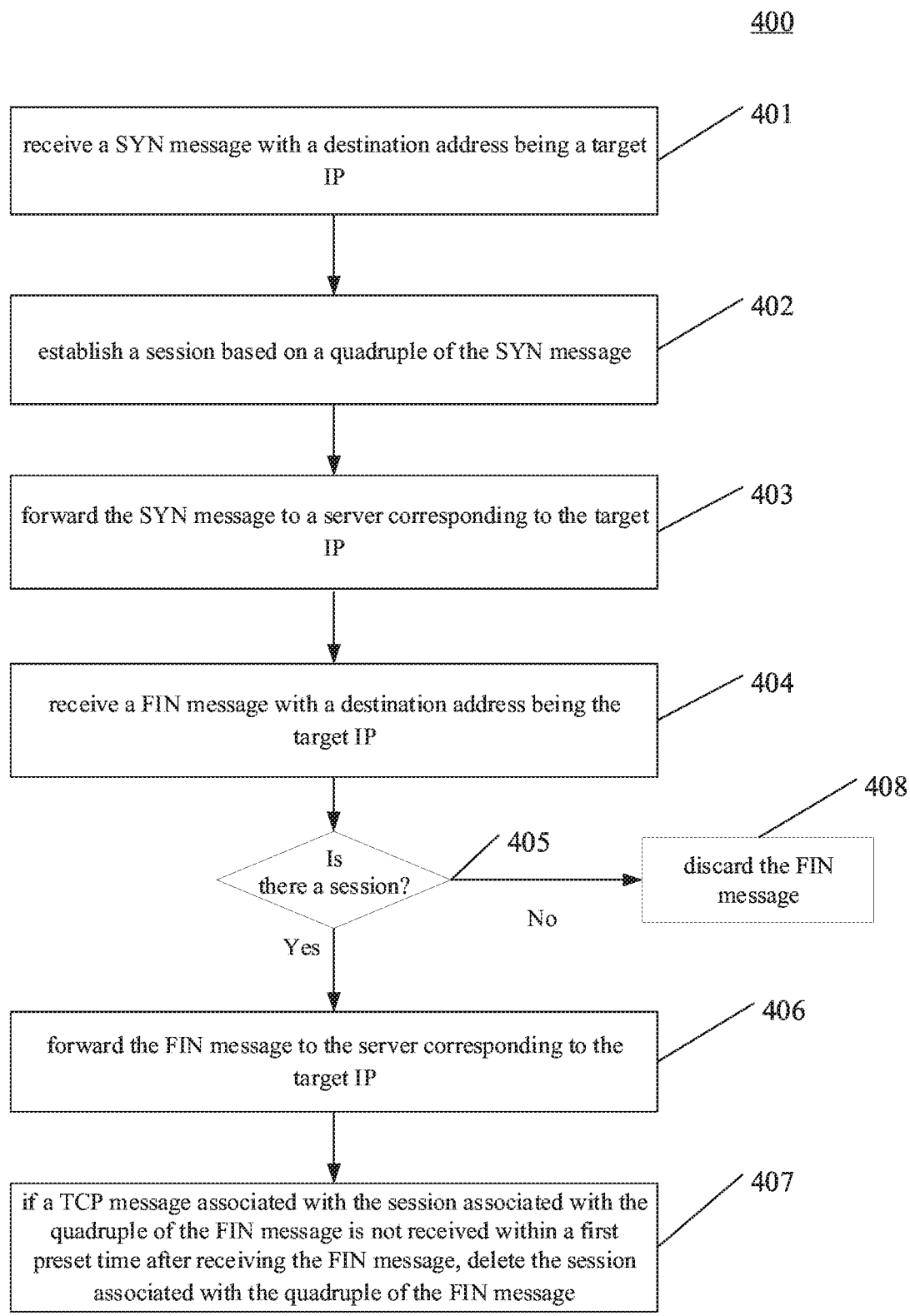
FIG. 4 is a flowchart of the method for processing data according to another embodiment of the present disclosure.

Further referring to FIG. 4, a process 400 of another embodiment of the method for processing data is shown. The process 400 of the method for processing data includes:

Step 401: receiving a SYN message with a destination address being a target IP.

Step 402: establishing a session based on a quadruple of the SYN message.

Step 403: forwarding the SYN message to a server corresponding to the target IP.

Steps 401-403 are basically identical to steps 201-203. Therefore, the description will not be repeated.

Step 404: receiving a FIN message with a destination address being the target IP.

In the present embodiment, the cleaning device receives a TCP message with a destination address being the target IP from a router. The message being the FIN message is determined based on a flag in the TCP message. FIN (finish): denotes a sending terminal having reached the end of the data, i.e., data transfer between both parties is completed, no data can be transmitted, and after sending a TCP packet of a FIN flag, the connection will be disconnected. Packets of this flag are often used for port scanning.

Step 405: determining whether there is a session associated with a quadruple of the FIN message.

In the present embodiment, the quadruple of the FIN message is matched with an existing session ID, and if the quadruple of the FIN message successfully matches the existing session ID, then it represents that there is the session associated with the quadruple of the FIN message. If the quadruple of the FIN message fails to match the existing session ID, then there is no session associated with the quadruple of the FIN message.

Step 406: if there is the session associated with the quadruple of the FIN message, forwarding the FIN message to the server corresponding to the target IP.

In the present embodiment, a FIN message having a established session is permitted through, such that a normal service message will not be cleaned by mistake.

Step 407: if a TCP message associated with the session associated with the quadruple of the FIN message is not received within a first preset time after receiving the FIN message, deleting the session associated with the quadruple of the FIN message.

In the present embodiment, the FIN message is likely to be retransmitted because of failure to be received by the server. Therefore, the first preset time is set. The first preset time is associated with the retransmission time, and may be set as 1 second. Receiving the FIN message twice does not affect updating the state of a state machine. Deleting the session after delaying a period of time can avoid that the retransmitted FIN message cannot be forwarded to the server because the session is deleted.

Step 408: discarding the FIN message, if there is no session associated with the quadruple of the FIN message.

In the present embodiment, if the received FIN message does not have a corresponding session, then the FIN message may be considered as attack data sent by an attacking terminal, and is discarded accordingly.

As can be seen from FIG. 4, compared with the corresponding embodiments of FIG. 2, the process 400 of the method for processing data in the present embodiment embodies the steps of deleting the session. Thus, the scheme described in the present embodiment can avoid various TCP flag DDoS attacks, thereby improving functions of the cleaning device.

Figure 5:
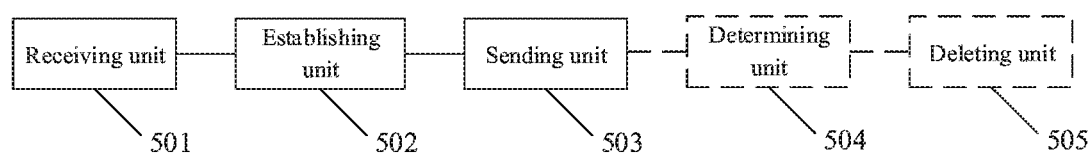
FIG. 5 is a schematic structural diagram of an apparatus for processing data according to an embodiment of the present disclosure.

Further referring to FIG. 5, as an implementation of the method shown in the above figures, an embodiment of the present disclosure provides an apparatus for processing data. The embodiment of the apparatus corresponds to the embodiment of the method shown in FIG. 2. The apparatus may be specifically applied to various electronic devices.

As shown in FIG. 5, the apparatus 500 for processing data in the present embodiment includes: a receiving unit 501, an establishing unit 502, and a sending unit 503. The receiving unit 501 is configured to receive a SYN message with a destination address being a target IP. The establishing unit 502 is configured to establish a session based on a quadruple of the SYN message. The sending unit 503 is configured to forward the SYN message to a server corresponding to the target IP.

Step 201, step 202, and step 203 in the corresponding embodiment of FIG. 2 may be referred to for specific processing of the receiving unit 501, the establishing unit 502, and the sending unit 503 of the apparatus 500 for processing data in the present embodiment.

In some alternative implementations of the present embodiment, the apparatus 500 further includes a determining unit 504 configured to: in response to receiving a message except for the SYN message, the destination address thereof being the target IP, determine whether there is a session is associated with a quadruple of the message except for the SYN message; If there is the session associated with the quadruple of the message except for the SYN message, then the message except for the SYN message is forwarded to the server corresponding to the target IP.

In some alternative implementations of the present embodiment, the determining unit 504 is further configured to: if there is no session associated with the tetrad of the message except for the SYN message, discard the message except for the SYN message.

In some alternative implementations of the present embodiment, the apparatus 500 further includes a deleting unit 505 configured to: delete the session, if an ACK message associated with the session is not received within a first preset time after establishing the session.

In some alternative implementations of the present embodiment, the deleting unit 505 is further configured to: if an ACK message responding to the SYN message is received within the first preset time after establishing the session and there is a session associated with a quadruple of the ACK message, forward the ACK message to the server corresponding to the target IP; and if a TCP message associated with the session associated with the quadruple of the ACK message is not received within a second preset time after receiving the ACK message responding to the SYN message within the first preset time after establishing the session, delete the session associated with the quadruple of the ACK message.

In some alternative implementations of the present embodiment, the deleting unit 505 is further configured to: if a FIN message is received and there is a session associated with a quadruple of the FIN message, forward the FIN message to the server corresponding to the target IP; and if a TCP message associated with the session associated with the quadruple of the FIN message is not received within a third preset time after receiving the FIN message, delete the session associated with the quadruple of the FIN message.

In some alternative implementations of the present embodiment, the deleting unit 505 is further configured to: if a RST message is received and there is a session associated with a quadruple of the RST message, forward the RST message to the server corresponding to the target IP, and immediately delete the session associated with the quadruple of the RST message.

Figure 6:
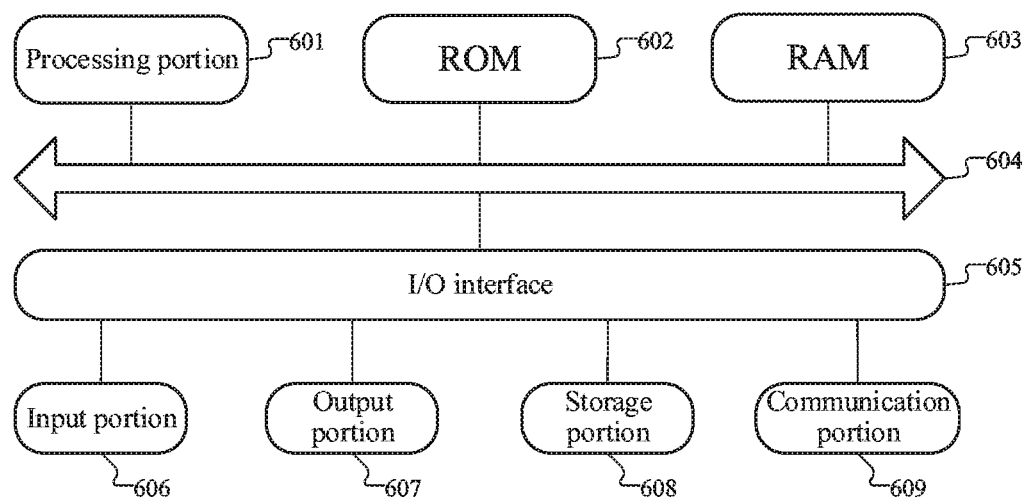
FIG. 6 is a schematic structural diagram of a computer system adapted to implement an electronic device of embodiments of the present disclosure

Referring to FIG. 6 below, a schematic structural diagram of an electronic device (e.g., the cleaning device in FIG. 1) 600 adapted to implement some embodiments of the present disclosure is shown. The cleaning device shown in FIG. 6 is merely an example, and should not impose any limitation on the function and usage range of the embodiments of the present disclosure.

As shown in FIG. 6, the electronic device 600 may include a processing unit (e.g., a central processing unit, or a graphics processor) 601, which may execute various appropriate actions and processes in accordance with a program stored in a read only memory (ROM) 602 or a program loaded into a random access memory (RAM) 603 from a storage unit 608. The RAM 603 further stores various programs and data required by operations of the electronic device 600. The processing unit 601, the ROM 602, and the RAM 603 are connected to each other through a bus 604. An input/output (I/O) interface 605 is also connected to the bus 604.

In general, the following components may be connected to the I/O interface 605: an input portion 606 including a touch screen, a touch pad, a keyboard, a mouse, a camera, a microphone, an accelerometer, a gyroscope, or the like; an output portion 607 including a liquid crystal display device (LCD), a speaker, a vibrator, or the like; a storage portion 608 including a magnetic tape, a hard disk, or the like; and a communication portion 609. The communication portion 609 may allow the electronic device 600 to exchange data with other devices through wireless or wired communication. While FIG. 6 shows the electronic device 600 having various components, it should be understood that it is not necessary to implement or provide all of the components shown in the figure. More or fewer units may be alternatively implemented or provided. Each block shown in FIG. 6 may represent a unit, or represent a plurality of units as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication unit 609, or be installed from the storage unit 608, or be installed from the ROM 602. The computer program, when executed by the processing unit 601, implements the above functions as defined by the method of the embodiments of the present disclosure. It should be noted that the computer readable medium of the embodiment of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include a data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may further be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The computer readable medium may be included in the above electronic device; or a stand-alone computer readable medium without being assembled into the electronic device.

The computer readable medium stores one or more programs. The one or more programs, when executed by the electronic device, cause the electronic device to: receive a SYN message with a destination address being a target IP; establish a session based on a quadruple of a TCP message; and forward the TCP message to a server corresponding to the target IP.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including a receiving unit, an establishing unit, and a sending unit. The names of these units do not constitute a limitation to such units themselves in some cases. For example, the receiving unit may also be described as "a unit configured to receive a SYN message with a destination address being a target IP."

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for processing data in a cleaning device, the method comprising:
   receiving a SYN message from a client with a destination address being a target IP;
   establishing a session with the client based on a quadruple of the SYN message; and
   forwarding the SYN message to a server corresponding to the target IP,
   wherein the method further comprises:
   in response to an ACK message responding to the SYN message from the client being received within a first preset time after establishing the session and there being a session associated with a quadruple of the ACK message, forwarding the ACK message to the server corresponding to the target IP; and
   in response to a TCP message associated with the session associated with the quadruple of the ACK message from the client being not received within a second preset time after receiving the ACK message responding to the SYN message within the first preset time after establishing the session, determining that the client is an attack client and deleting the session associated with the quadruple of the ACK message;
   in response to receiving a message except for the SYN message, the destination address thereof being the target IP, determining whether there is a session associated with a quadruple of the message except for the SYN message;
   in response to there being the session associated with the quadruple of the message except for the SYN message, forwarding the message except for the SYN message to the server corresponding to the target IP; and
   in response to there being no session associated with the quadruple of the message except for the SYN message, discarding the message except for the SYN message.

2. The method according to claim 1, wherein the method further comprises:
   in response to an ACK message associated with the session being not received within the first preset time after establishing the session, deleting the session.

3. The method according to claim 1, wherein the method further comprises:
   in response to a FIN message being received and there being a session associated with a quadruple of the FIN message, forwarding the FIN message to the server corresponding to the target IP; and
   in response to a TCP message associated with the session associated with the quadruple of the FIN message being not received within a third preset time after receiving the FIN message, deleting the session associated with the quadruple of the FIN message.

4. The method according to claim 1, wherein the method further comprises:
   in response to a RST message being received and there being a session associated with a quadruple of the RST message, forwarding the RST message to the server corresponding to the target IP, and immediately deleting the session associated with the quadruple of the RST message.

5. An apparatus for processing data in a cleaning device, comprising:
   at least one processor; and a memory storing instructions, the instructions when executed by the at least one processor, cause the at least one processor to perform operations, the operations comprising:

receiving a SYN message from a client with a destination address being a target IP;

establishing a session with the client based on a quadruple of the SYN message; and forwarding the SYN message to a server corresponding to the target IP, wherein the operations further comprise:

in response to an ACK message responding to the SYN message from the client being received within a first preset time after establishing the session and there being a session associated with a quadruple of the ACK message, forwarding the ACK message to the server corresponding to the target IP; and in response to a TCP message associated with the session associated with the quadruple of the ACK message from the client being not received within a second preset time after receiving the ACK message responding to the SYN message within the first preset time after establishing the session, determining that the client is an attack client and deleting the session associated with the quadruple of the ACK message;

in response to receiving a message except for the SYN message, the destination address thereof being the target IP, determining whether there is a session associated with a quadruple of the message except for the SYN message;

in response to there being the session associated with the quadruple of the message except for the SYN message, forwarding the message except for the SYN message to the server corresponding to the target IP; and in response to there being no session associated with the quadruple of the message except for the SYN message, discarding the message except for the SYN message.

6. The apparatus according to claim 5, wherein operations further comprise:

deleting the session, in response to an ACK message associated with the session being not received within the first preset time after establishing the session.

7. The apparatus according to claim 5, wherein the operations further comprise:

in response to a FIN message being received and there being a session associated with a quadruple of the FIN message, forwarding the FIN message to the server corresponding to the target IP; and in response to a TCP message associated with the session associated with the quadruple of the FIN message being not received within a third preset time after receiving the FIN message, deleting the session associated with the quadruple of the FIN message.

8. The apparatus according to claim 5, wherein the operations further comprise:

in response to a RST message being received and there being a session associated with a quadruple of the RST message, forwarding the RST message to the server corresponding to the target IP, and immediately deleting the session associated with the quadruple of the RST message.

9. A non-transitory computer readable medium, storing a computer program thereon, wherein the program, when executed by a processor, causes the processor to perform operations, the operations comprising:

receiving a SYN message from a client with a destination address being a target IP;

establishing a session with the client based on a quadruple of the SYN message; and forwarding the SYN message to a server corresponding to the target IP, wherein the operations further comprise:

in response to an ACK message responding to the SYN message from the client being received within the first preset time after establishing the session and there being a session associated with a quadruple of the ACK message, forwarding the ACK message to the server corresponding to the target IP; and in response to a TCP message associated with the session associated with the quadruple of the ACK message from the client being not received within a second preset time after receiving the ACK message responding to the SYN message within the first preset time after establishing the session, determining that the client is an attack client and deleting the session associated with the quadruple of the ACK message;

in response to receiving a message except for the SYN message, the destination address thereof being the target IP, determining whether there is a session associated with a quadruple of the message except for the SYN message;

in response to there being the session associated with the quadruple of the message except for the SYN message, forwarding the message except for the SYN message to the server corresponding to the target IP; and in response to there being no session associated with the quadruple of the message except for the SYN message, discarding the message except for the SYN message.

10. The medium according to claim 9, wherein the operations further comprise:

in response to an ACK message associated with the session being not received within the first preset time after establishing the session, deleting the session.

11. The medium according to claim 9, wherein the operations further comprise:

in response to a FIN message being received and there being a session associated with a quadruple of the FIN message, forwarding the FIN message to the server corresponding to the target IP; and in response to a TCP message associated with the session associated with the quadruple of the FIN message being not received within a third preset time after receiving the FIN message, deleting the session associated with the quadruple of the FIN message.

* * * * *